US011197189B2

United States Patent
Chin et al.

(10) Patent No.: US 11,197,189 B2
(45) Date of Patent: Dec. 7, 2021

(54) METHOD AND APPARATUS FOR SR AND BSR CANCELLATION

(71) Applicant: FG Innovation Company Limited, Tuen Mun (HK)

(72) Inventors: Heng-Li Chin, Taipei (TW); Chia-Hung Wei, Hsinchu (TW); Hung-Chen Chen, Hsinchu (TW)

(73) Assignee: FG INNOVATION COMPANY LIMITED, Tuen Mun (HK)

(*) Notice: Subject to any disclaimer, the term of this patent is extended or adjusted under 35 U.S.C. 154(b) by 30 days.

(21) Appl. No.: 16/744,964

(22) Filed: Jan. 16, 2020

(65) Prior Publication Data
US 2020/0236582 A1    Jul. 23, 2020

Related U.S. Application Data

(60) Provisional application No. 62/793,478, filed on Jan. 17, 2019.

(51) Int. Cl.
| | | |
|---|---|---|
| *H04W 28/02* | (2009.01) | |
| *H04W 72/12* | (2009.01) | |
| *H04W 72/14* | (2009.01) | |
| *H04W 80/02* | (2009.01) | |
| *H04W 72/04* | (2009.01) | |

(52) U.S. Cl.
CPC ..... *H04W 28/0278* (2013.01); *H04W 72/042* (2013.01); *H04W 72/1242* (2013.01); *H04W 72/1273* (2013.01); *H04W 72/14* (2013.01); *H04W 80/02* (2013.01)

(58) Field of Classification Search
CPC .......... H04W 72/042; H04W 72/1242; H04W 72/1273; H04W 72/14; H04W 72/04; H04W 72/02; H04W 28/0278; H04W 80/02

See application file for complete search history.

(56) References Cited

U.S. PATENT DOCUMENTS

| | | | | |
|---|---|---|---|---|
| 2014/0056278 | A1* | 2/2014 | Marinier | H04W 72/1268 |
| | | | | 370/330 |
| 2017/0273071 | A1* | 9/2017 | Nogami | H04W 72/1242 |
| 2018/0324635 | A1* | 11/2018 | Babaei | H04W 74/0891 |
| 2018/0332580 | A1* | 11/2018 | Dinan | H04W 72/0446 |
| 2019/0182896 | A1* | 6/2019 | Shrestha | H04W 72/14 |
| 2020/0196327 | A1* | 6/2020 | Zhang | H04W 72/1242 |
| 2020/0245395 | A1* | 7/2020 | Zhang | H04L 5/0053 |
| 2020/0281012 | A1* | 9/2020 | Behravan | H04W 72/1284 |

* cited by examiner

*Primary Examiner* — Candal Elpenord
(74) *Attorney, Agent, or Firm* — Polsinelli

(57) ABSTRACT

A method for wireless communication performed by a UE is provided. The method includes: triggering a BSR; triggering an SR; receiving a UL grant that allocates a PUSCH duration; performing MAC PDU assembly to obtain a MAC PDU for transmission on the PUSCH duration; and performing an update process after determining that the MAC PDU includes a BSR MAC CE containing buffer status information up to a last event that triggers the BSR prior to the MAC PDU assembly; wherein the update process includes keeping the SR triggered prior to the MAC PDU assembly pending at the start of the PUSCH duration.

20 Claims, 5 Drawing Sheets

METHOD AND APPARATUS FOR SR AND BSR CANCELLATION

CROSS-REFERENCE TO RELATED APPLICATION(S)

The present application claims the benefit of and priority to a provisional U.S. Patent Application Ser. No. 62/793,478, filed on Jan. 17, 2019, entitled "SR and BSR Cancellation Policy for Industrial Internet of Things (IIoT)," (hereinafter referred to as "US76372 application"). The disclosure of the US76372 application is hereby incorporated fully by reference into the present application.

FIELD

The present disclosure generally relates to wireless communication, and more particularly, to a method for handling a triggered scheduling request (SR) and a triggered buffer status report (BSR) in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. For uplink (UL) transmission, a BSR is sent by a user equipment (UE) to a base station (e.g., a gNB) to indicate the data amount in the UL buffer of the UE. The BSR is typically transmitted using a Medium Access Control (MAC) control element (CE) in a Physical Uplink Shared Channel (PUSCH). A scheduling request (SR) is a message (e.g., a 1-bit message) sent from the UE to the base station to request UL resource for data transmission. The SR is typically transmitted on a Physical Uplink Control Channel (PUCCH). In NR, a PUSCH for transmitting a BSR MAC CE may overlap in the time domain with a PUCCH for transmitting an SR. In addition, multiple PUSCH durations may overlap in the time domain. As such, there is a need in the industry for an improved and efficient mechanism for a UE to handle a triggered SR and a triggered BSR to resolve the aforementioned overlapping conditions.

SUMMARY

The present disclosure is directed to a method for handling a triggered SR and a triggered BSR performed by a UE in the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: trigger a BSR; trigger an SR; receive an uplink (UL) grant that allocates a Physical Uplink Shared Channel (PUSCH) duration; perform Medium Access Control (MAC) Protocol Data Unit (PDU) assembly to obtain a MAC PDU for transmission on the PUSCH duration; perform an update process after determining that the MAC PDU includes a BSR MAC Control Element (CE) containing buffer status information up to a last event that triggers the BSR prior to the MAC PDU assembly; wherein the update process includes keeping the SR triggered prior to the MAC PDU assembly pending at the start of the PUSCH duration.

According to another aspect of the present disclosure, a method for wireless communication performed by a UE is provided. The method includes: triggering a BSR; triggering an SR; receiving an UL grant that allocates a PUSCH duration; performing MAC PDU assembly to obtain a MAC PDU for transmission on the PUSCH duration; and performing an update process after determining that the MAC PDU includes a BSR MAC CE containing buffer status information up to a last event that triggers the BSR prior to the MAC PDU assembly; wherein the update process includes keeping the SR triggered prior to the MAC PDU assembly pending at the start of the PUSCH duration.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
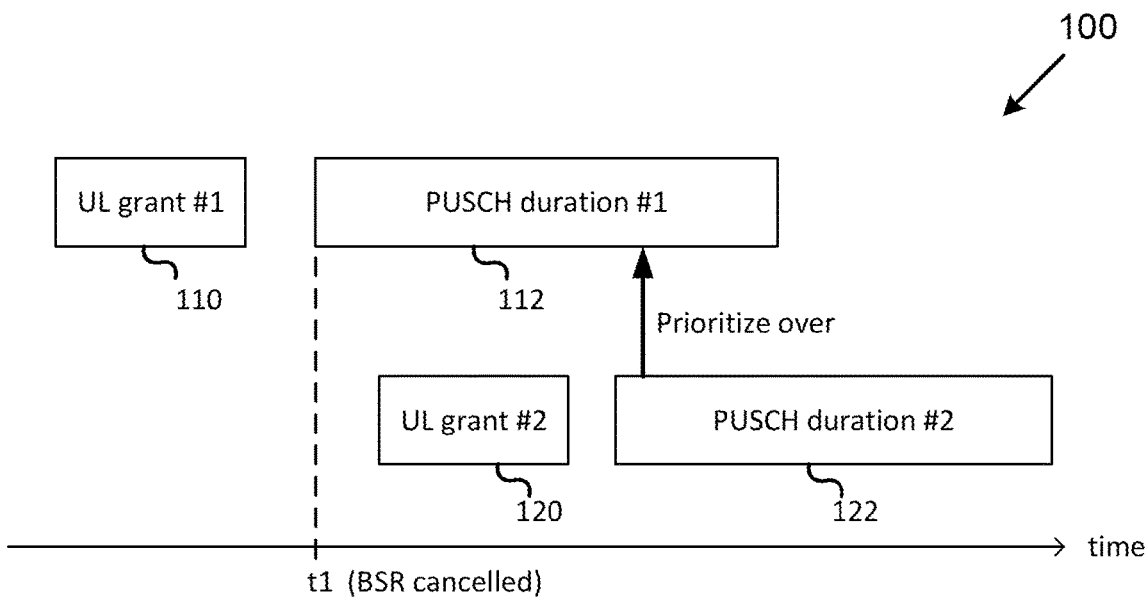
FIG. 1 includes a diagram illustrating an example intra-UE UL prioritization, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In one or more implementations of the present application, a UE may be configured (e.g., configured by Radio Resource Control (RRC) signaling) with one or more logical channel groups (LCGs), with each LCG may include one or more logical channels (LCHs). When the UE receives an UL grant for new data transmission (e.g., a New Data Indicator (NDI) provided in the associated Hybrid Automatic Repeat Request (HARQ) information of the UL grant has been toggled compared to the NDI value in the previous transmission of this HARQ process), the UE (e.g., a Multiplexing and Assembly entity in a MAC entity of the UE) may allocate resource to MAC CE(s) and data from LCHs that is available for transmission based on a Logical Channel Prioritization (LCP) rule. A MAC PDU may then be assembled and ready for transmission on a PUSCH duration indicated by the UL grant. A buffer status report (BSR) may be triggered (e.g., by the MAC entity of the UE) for several seasons, such as when an LCH has new data arrival while there is no data in any other configured LCHs, or when an LCH has new data arrival and this LCH has higher priority than any LCH containing available UL data. When a BSR is triggered, the BSR is considered as pending until being cancelled. A scheduling request (SR) may also be triggered (e.g., by the MAC entity of the UE) for several reasons, such as when there is a pending BSR and there is no available UL resource for transmitting the BSR MAC CE, or when UL resources (e.g., PUSCH resources) available for new data transmission do not meet the LCP mapping restrictions configured for the LCH that triggered the BSR. When the SR is triggered, the SR is considered as pending until being cancelled.

Case 1: BSR Cancellation

In one implementation, the UE may generate a BSR MAC CE when an UL grant (that schedules an UL resource) arrives and there is a pending BSR. The UE may obtain a MAC PDU and the BSR MAC CE may be included in the MAC PDU (to be transmitted on the UL resource scheduled by the UL grant). In one implementation, the MAC entity may perform MAC PDU assembly to obtain the MAC PDU for uplink transmission. The BSR MAC CE may contain buffer status information of each configured LCG. The BSR MAC CE may inform the network the type (e.g., LCG) and amount of data (e.g., buffer status information) that is ready for transmission. In one implementation, all BSRs triggered prior to the MAC PDU assembly may be cancelled when a MAC PDU is transmitted and the MAC PDU includes a Long or Short BSR MAC CE which contains buffer status information up to (and including) the last event that triggered a BSR prior to the MAC PDU assembly.

In one implementation, intra-UE UL preemption (or prioritization) may take place when a PUSCH duration (or UL resource) overlaps with another PUSCH duration (or UL resource). One PUSCH duration may prioritize over another based on an explicit or implicit prioritization rule. If the BSR is cancelled at the start of a PUSCH transmission, the cancelled BSR may not be received by a base station (e.g., a gNB) because an ongoing PUSCH transmission that includes the BSR MAC CE may be interrupted by another PUSCH transmission with a higher priority.

FIG. 1 includes a diagram 100 illustrating an example intra-UE UL prioritization, according to an example implementation of the present application. The UE receives UL grant #1 110 (e.g., one format of Downlink Control Information (DCI)) that allocates PUSCH duration #1 112 for a new data transmission (e.g., NDI is toggled in UL grant #1 110), which may be referred to as a first data transmission. The UE may then determine a BSR format based on the number of LCGs with data available and the size of the given UL grant #1 110. If a Long/Short BSR MAC CE is generated, and the BSR MAC CE contains buffer status information up to (and including) the last event that triggered a BSR prior to the MAC PDU assembly, the UE may cancel all the triggered BSR prior to the MAC PDU assembly at time t1 when the MAC PDU that includes the Long/Short BSR MAC CE is transmitted. As shown in FIG. 1, not long after the UE commences the first data transmission on PUSCH duration #1 112, the UE receives another UL grant #2 120 that allocates PUSCH duration #2 122 for another new data transmission (e.g., NDI is toggled in UL grant #2 120), which may be referred to as a second data transmission. PUSCH duration #2 122 overlaps in the time domain with PUSCH duration #1 112 in which the first data transmission is ongoing. As a result, the ongoing first data transmission on PUSCH duration #1 112 that includes the Long/Short BSR MAC CE may not be successfully received by the base station if the priority of PUSCH duration #2 122 is higher than that of PUSCH duration #1 112 based on an explicit or implicit prioritization rule. However, all BSRs triggered prior to the MAC PDU assembly have already been cancelled at time t1, and the UE may not have a chance to generate another BSR MAC CE for transmission on PUSCH duration #2 122 if no BSR is triggered before generating the new BSR MAC CE. This may result in extra delay and service degradation, especially when the cancelled BSR(s) are from LCHs associated with higher priorities, such as Ultra Reliable and Low Latency Communications (URLLC) LCHs. The following implementations are provided to avoid unsuccessful transmission of BSR(s) due to intra-UE UL preemption by another PUSCH.

Case 1-1: Cancelling BSR at the End of a PUSCH Duration

In one implementation, all BSRs triggered prior to the MAC PDU assembly may be cancelled when the MAC PDU is completely transmitted and the MAC PDU includes a Long or Short BSR MAC CE which contains buffer status information up to (and including) the last event that triggered a BSR prior to the MAC PDU assembly. In the present disclosure, a complete MAC PDU transmission may refer to either the end of the corresponding PUSCH duration (which is indicated by the UL grant) for the MAC PDU transmission or the end of the last symbol of the corresponding PUSCH duration for the MAC PDU transmission. In this sense, all triggered BSR prior to the MAC PDU assembly may be cancelled upon completion of the PUSCH transmission (e.g., at the end of the PUSCH duration). In one implementation, the UE (e.g., the MAC entity of the UE) may keep the BSR triggered prior to the MAC PDU assembly pending at the start of the PUSCH duration. In one implementation, the UE may cancel the pending BSR triggered prior to the MAC PDU assembly at the end of the PUSCH duration.

Figure 2:
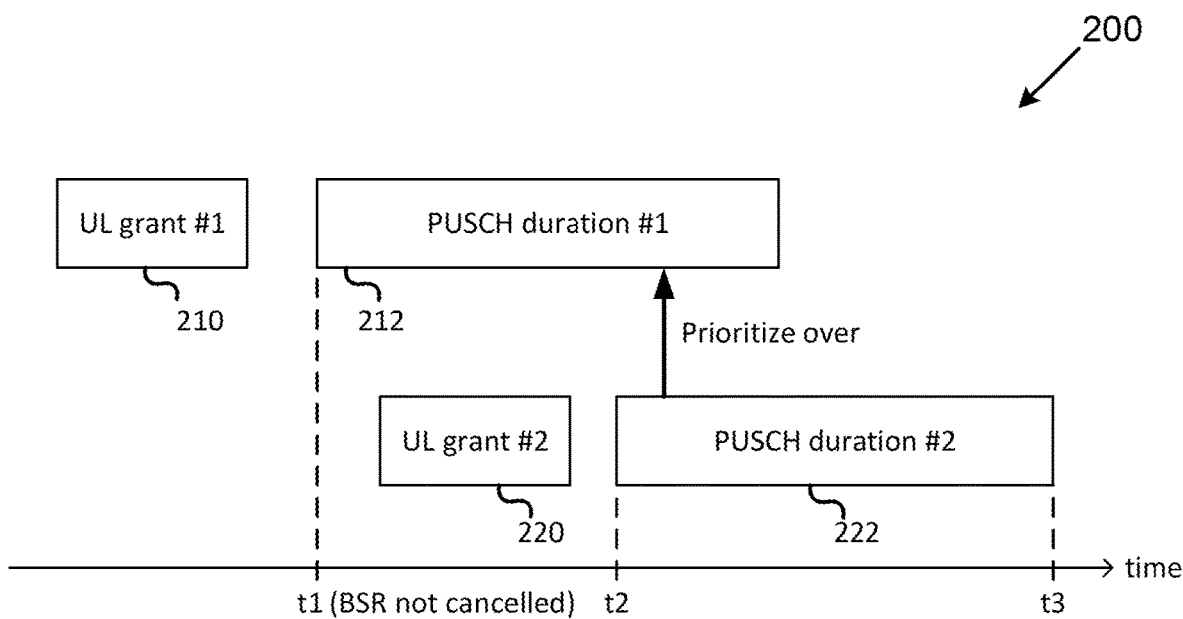
FIG. 2 includes a diagram illustrating an example intra-UE UL prioritization where a BSR is cancelled when a MAC PDU is completely transmitted, according to an example implementation of the present application.

FIG. 2 includes a diagram 200 illustrating an example intra-UE UL prioritization where a BSR is cancelled when a MAC PDU is completely transmitted, according to an example implementation of the present application. The UE receives UL grant #1 210 that allocates PUSCH duration #1 212 for new data transmission. In this example, the BSRs triggered prior to the assembly of a MAC PDU to be transmitted on PUSCH duration #1 212, as indicated by UL grant #1 210, are not yet cancelled while the PUSCH duration #1 212 transmission is ongoing even if the MAC PDU includes a Long or Short BSR MAC CE which contains buffer status information up to (and including) the last event that triggered the BSR prior to the MAC PDU assembly. As such, even if PUSCH duration #1 212 indicated by UL grant #1 210 is interrupted by PUSCH duration #2 222 indicated by UL grant #2 220 as a result of intra-UE UL prioritization, the uncancelled BSRs may lead to the generation of another Long/Short BSR MAC CE, which may then be transmitted on PUSCH duration #2 222 indicated by UL grant #2 220. In this example, all BSRs triggered prior to the assembly of the MAC PDU to be transmitted on PUSCH duration #2 222 may be cancelled at time t3 after the MAC PDU has been completely transmitted on PUSCH duration #2 222 indicated by UL grant #2 220 if the MAC PDU includes a Long or Short BSR MAC CE which contains buffer status information up to (and including) the last event that triggered the BSR prior to the assembly of the MAC PDU to be transmitted on PUSCH duration #2 222.

Case 1-2: Cancelling BSR at the End of a PUSCH Duration when the MAC PDU does not Include Data from an LCH Associated with a high priority In one implementation, all BSRs triggered prior to the MAC PDU assembly of a non-URLLC MAC PDU may be cancelled when the non-URLLC MAC PDU is completely transmitted and the MAC PDU includes a Long or Short BSR MAC CE which contains buffer status information up to (and including) the last event that triggered the BSR prior to the MAC PDU assembly. On the other hand, all BSRs triggered prior to the MAC PDU assembly of a URLLC MAC PDU may be cancelled when the URLLC MAC PDU starts to be transmitted and the MAC PDU includes a Long or Short BSR MAC CE which contains buffer status information up to (and including) the last event that triggered the BSR prior to the MAC PDU assembly. In one implementation, the term non-URLLC MAC PDU may refer to a MAC PDU that does not include any data from a logical channel associated with a high priority (e.g., a URLLC LCH). Similarly, the term URLLC MAC PDU may refer to a MAC PDU that includes data from a logical channel associated with a high priority (e.g., a URLLC LCH). Some implementations of a URLLC LCH will be described in Cases 4-1 through 4-7. In one implementation, a priority of a logical channel may be determined by a priority parameter configured for the logical channel (e.g., a parameter priority configured in a logical channel configuration information element (IE), such as LogicalChannelConfig IE). In one implementation, a logical channel may be determined as having a high priority if the parameter priority configured for this logical channel is above a specific priority value. The specific priority value may be preconfigured by the UE or may be configured by the network via dedicated signaling.

One of the reasons to have different cancellation policies between non-URLLC MAC PDU and URLLC PDU is that the transmission of a non-URLLC MAC PDU may be interrupted by another UL transmission with a higher priority as a result of the intra-UE UL prioritization. By ensuring that the cancellation of the triggered BSR occurs at the end of non-URLLC MAC PDU transmission, the triggered BSRs may not have been cancelled if the UE receives another UL grant indicating a higher priority and prioritizes/ stops/interrupts/preempts the ongoing non-URLLC MAC PDU transmission (as a result of intra-UE UL prioritization). As such, the uncancelled BSRs may consequently lead to the generation of another BSR MAC CE, which may be transmitted on the PUSCH indicated by the UL grant with a higher priority. On the contrary, for a URLLC MAC PDU, the triggered BSR may be cancelled at the start of URLLC MAC PDU transmission if the URLLC MAC PDU includes a Long or Short BSR MAC CE which contains buffer status information up to (and including) the last event that triggered the BSR prior to the URLLC MAC PDU assembly. The reason is that it is assumed that a URLLC MAC PDU may not be interrupted by another UL grant.

Referring to the example shown in FIG. 2, after receiving UL grant #1 210, the MAC entity of a UE may start to prepare a MAC PDU for transmission on PUSCH duration #1 212. In the present implementation, a non-URLLC MAC PDU is generated by the MAC entity and the MAC PDU contains buffer status information up to (and including) the last event that triggered a BSR prior to the MAC PDU assembly. Based on the implementation in Case 1-2, the triggered BSRs prior to the non-URLLC MAC PDU assembly may be cancelled at the end of PUSCH duration #1 212. However, the UE receives UL grant #2 220 during transmission on PUSCH duration #1 212. The transmission on PUSCH duration #1 212 may be interrupted/stopped/cancelled/prioritized by the UL grant #2 220 as a result of the intra-UE UL prioritization. As a consequence, another MAC PDU may be generated for transmission on PUSCH duration #2 222. In the present implementation, a URLLC MAC PDU is generated for UL grant #2 and the MAC PDU also contains buffer status information up to (and including) the last event that triggered a BSR prior to the MAC PDU assembly. This time, all triggered BSR(s) prior to this URLLC MAC PDU assembly may be cancelled at the start of the MAC PDU transmission on the PUSCH duration #2 222, which is time t2 shown in FIG. 2.

Case 1-3: Cancelling BSR at the End of a PUSCH Duration when the BSR is Triggered by an LCH Associated with a High Priority In one implementation, all BSRs triggered by logical channels associated with low priorities (e.g., non-URLLC LCHs) prior to the MAC PDU assembly may be cancelled when a MAC PDU is transmitted (e.g., at the start of a PUSCH duration) and the MAC PDU includes a Long or Short BSR MAC CE which contains buffer status information up to (and including) the last event that triggered the BSR prior to the MAC PDU assembly. On the other hand, all BSRs triggered by logical channels associated with high priorities (e.g., URLLC LCHs) prior to the MAC PDU assembly may be cancelled when a MAC PDU is completely transmitted (e.g., at the end of a PUSCH duration) and the MAC PDU includes a Long or Short BSR MAC CE which contains buffer status information up to (and including) the last event that triggered the BSR prior to the MAC PDU assembly. Some implementations of a URLLC LCH will be described in Cases 4-1 through 4-7.

One of the reasons to have different cancellation policies between a non-URLLC LCH and a URLLC LCH is that the delay requirement for data from the non-URLLC LCH may be less strict than data from the URLLC LCH. For example, the BSRs triggered by the non-URLLC LCHs may be cancelled upon transmission of the MAC PDU. However, the base station may fail to receive the BSR MAC CE in the MAC PDU if the ongoing MAC PDU transmission is interrupted/prioritized/stopped/cancelled due to the intra-UE UL prioritization. Even if extra delay (e.g., the time needed for the network to reschedule the UE a UL resource for retransmission of the cancelled MAC PDU, the time needed for the UE to transmit the cancelled MAC PDU on the rescheduled UL resource, etc.) is introduced in such case, the delay requirement of a non-URLLC LCH may still be met by a proper configuration of a periodic BSR timer (e.g., a parameter periodicBSR-Timer) and a retransmission BSR timer (e.g., a parameter rebcBSR-Timer), because the UE may automatically trigger another BSR upon expiration of the configured periodic BSR timer and/or retransmission BSR timer. In contrast, a URLLC LCH may be used to serve data with strict delay requirement, the extra delay caused by the intra-UE UL prioritization may be more impactful for BSRs triggered by the URLLC LCHs. Therefore, in one implementation, BSRs triggered by URLLC LCHs may be cancelled at the end of a PUSCH duration.

Case 1-4: Cancelling BSR at the End of a PUSCH Duration when the UL Grant is Associated with a Low Priority In one implementation, all BSRs triggered prior to the MAC PDU assembly may be cancelled when the MAC PDU is transmitted (e.g., at the start of a PUSCH duration) on a PUSCH scheduled by a UL grant associated with a high priority (e.g., a URLLC UL grant) and the MAC PDU includes a Long or Short BSR MAC CE which contains buffer status information up to (and including) the last event that triggered the BSR prior to the MAC PDU assembly. On the other hand, all BSRs triggered prior to the MAC PDU assembly may be cancelled when the MAC PDU is completely transmitted (e.g., at the end of a PUSCH duration) on a PUSCH scheduled by a UL grant associated with a low priority (e.g., a non-URLLC UL grant) and the MAC PDU includes a Long or Short BSR MAC CE which contains buffer status information up to (and including) the last event that triggered the BSR prior to the MAC PDU assembly. One of the reasons to have different cancellation policies between a non-URLLC UL grant and a URLLC UL grant is that a non-URLLC UL grant may be prioritized by another PUSCH/PUCCH resource according to an implicit/explicit intra-UE UL prioritization rule (e.g., a URLLC UL grant). In contrast, a URLLC UL grant may not be prioritized by another PUSCH/PUCCH resource. Some implementations of a URLLC UL grant will be described in Cases 5-1 through Case 5-5.

Case 2: SR Cancellation

When a triggered SR is pending, the UE may transmit the SR on a configured PUCCH resource (e.g., configured via RRC signaling) that maps to the SR configuration of the pending SR. The purpose of the SR is to inform the network that the UE needs a UL resource for transmission. Unlike a BSR MAC CE that informs the network the type and amount of data that is ready for transmission, the SR may inform the network that the UE has some UL data ready for transmission (e.g., the SR may contain less information compared to the BSR MAC CE). In one implementation, all pending SR(s) triggered prior to the MAC PDU assembly may be cancelled and each respective SR prohibit timer (e.g., a parameter sr-ProhibitTimer) may be stopped when the MAC PDU is transmitted and the MAC PDU includes a BSR MAC CE which contains buffer status information up to (and including) the last event that triggered a BSR prior to the MAC PDU assembly.

Figure 3:
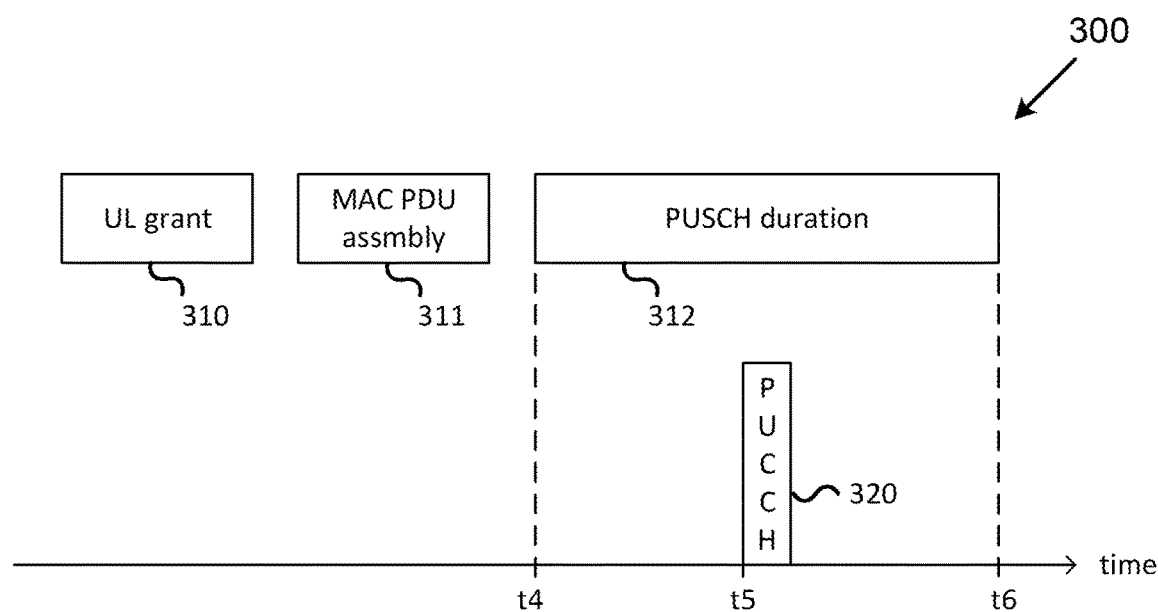
FIG. 3 includes a diagram illustrating a PUSCH duration overlapping with a PUCCH duration, according to an example implementation of the present application.

FIG. 3 includes a diagram 300 illustrating a PUSCH duration overlapping with a PUCCH duration, according to an example implementation of the present application. The UE receives UL grant 310 for a new data transmission, and the UE may perform MAC PDU assembly 311 for generating a MAC PDU for transmission on PUSCH duration 312 (e.g., time t4 through t6) allocated by UL grant 310. Assuming a regular BSR is triggered in this example and subsequently an SR is triggered (e.g., triggered before MAC PDU assembly 311), and PUCCH duration 320 that maps to the SR configuration of the triggered SR (e.g., PUCCH duration 320 can be used to transmit the triggered SR) overlaps with PUSCH duration 312. PUCCH duration 320 may be configured by the base station (e.g., via RRC signaling).

In one implementation, when a BSR MAC CE is included in the MAC PDU to be transmitted on PUSCH duration 312 and the BSR MAC CE contains the buffer status information of all the triggered BSR(s) prior to MAC PDU assembly 311, the SR may be cancelled at the start of PUSCH duration 312, which is time t4 shown in FIG. 3. In one scenario, intra-UE UL preemption (or prioritization) mechanism may take place in some implementations. For example, based on an implicit or explicit prioritization rule, PUSCH duration 312 may be prioritized over PUCCH duration 320 in some cases, and PUCCH duration 320 may be prioritized over PUSCH duration 312 in some other cases. In another scenario, the transmitted PUSCH duration 312 may not be successfully received by the network due to poor channel condition. Hence, if the SR is triggered by an LCH configured for URLLC services, the UE may not be able to transmit the SR at time t5 where PUCCH duration 320 is located because the SR has been cancelled. In such case, the length of PUSCH duration 312 (which may be one or more slots) may significantly delay the UE's request to the base station for an URLLC UL grant. The following implementations are provided to avoid cancellation of a pending SR when a MAC PDU is transmitted, such that the SR may have a chance to be transmitted on PUCCH duration 320.

Case 2-1: Cancelling SR at the End of a PUSCH Duration

In one implementation, all pending SR(s) triggered prior to the MAC PDU assembly may be cancelled and each respective sr-ProhibitTimer may be stopped when the MAC PDU is completely transmitted (e.g., at the end of the PUSCH duration for transmitting the MAC PDU) and the MAC PDU includes a BSR MAC CE which contains buffer status information up to (and including) the last event that triggered a BSR prior to the MAC PDU assembly. In one implementation, the UE (e.g., the MAC entity of the UE) may keep the SR triggered prior to the MAC PDU assembly pending at the start of the PUSCH duration. In one implementation, the UE may cancel the pending SR triggered prior to the MAC PDU assembly at the end of the PUSCH duration.

Referring to the example shown in FIG. 3, the implementation in Case 2-1 postpones the SR cancellation from time t4 to time t 6. As such, the SR may be transmitted on PUCCH duration 320 if PUCCH duration 320 for SR transmission has a higher priority than PUSCH duration 312. That is, the UE may report the triggered SR at time t5, which greatly reduces the delay for the UE's request for a UL grant. In one implementation, SRs applying different SR configurations may be treated as having different priority levels.

Case 2-2: Cancelling SR at the End of a PUSCH Duration when the SR is Triggered by an LCH Associated with a High Priority In one implementation, all pending SRs triggered by logical channels associated with low priorities (e.g., non-URLLC LCHs) prior to the MAC PDU assembly may be cancelled and each respective sr-ProhibitTimer may be stopped when the MAC PDU is transmitted (e.g., at the start of a PUSCH duration) and the MAC PDU includes a BSR MAC CE which contains buffer status information up to (and including) the last event that triggered a BSR prior to the MAC PDU assembly. On the other hand, all pending SRs triggered by logical channels associated with high priorities (e.g., URLLC LCHs) prior to the MAC PDU assembly may be cancelled and each respective sr-ProhibitTimer may be stopped when the MAC PDU is completely transmitted (e.g., at the end of a PUSCH duration) and the MAC PDU includes a BSR MAC CE which contains buffer status information up to (and including) the last event that triggered a BSR prior to the MAC PDU assembly. Some implementations of a URLLC LCH will be described in Cases 4-1 through 4-7.

One of the reasons to have different cancellation policies between a non-URLLC LCH and a URLLC LCH is that the delay requirement (e.g., delay tolerance) for data from the non-URLLC LCH may be less strict than data from the URLLC LCH. Referring to the example shown in FIG. 3, when overlapping occurs between PUSCH duration 312 and PUCCH duration 320 corresponding to the SR configuration(s) of the URLLC LCH(s) that triggered the SR(s), the UE may signal an SR directly and reduces the delay due to PUSCH duration 312 if PUCCH duration 320 has a higher priority than PUSCH duration 312.

Case 2-3: Cancelling SR at the End of a PUSCH Duration when the MAC PDU does not Include Data from an LCH Associated with a High Priority In one implementation, all pending SR(s) triggered prior to the non-URLLC MAC PDU assembly may be cancelled and each respective sr-ProhibitTimer may be stopped when the non-URLLC MAC PDU is completely transmitted and the MAC PDU includes a BSR MAC CE which contains buffer status information up to (and including) the last event that triggered a BSR prior to the MAC PDU assembly. On the other hand, all pending SR(s) triggered prior to the URLLC MAC PDU assembly may be cancelled and each respective sr-ProhibitTimer may be stopped when the URLLC MAC PDU is transmitted and the MAC PDU includes a BSR MAC CE which contains buffer status information up to (and including) the last event that triggered a BSR prior to the MAC PDU assembly. In one implementation, a non-URLLC MAC PDU may refer to a MAC PDU that does not include any data from a logical channel associated with a high priority (e.g., a URLLC LCH); a URLLC MAC PDU may refer to a MAC PDU that includes data from at least one logical channel associated with a high priority (e.g., a URLLC LCH). Some implementations of a URLLC LCH will be described in Cases 4-1 through 4-7.

One of the reasons to have different cancellation policies between a non-URLLC MAC PDU and a URLLC MAC PDU is that a URLLC MAC PDU includes data from URLLC LCH(s), the base station may have already considered the LCP mapping restriction(s) of the URLLC LCH(s) on the UE when the base station provides a UL grant that can be used by URLLC LCH(s). From the delay requirement's point of view, the PUSCH duration intended for a URLLC MAC PDU may be shorter than the maximum PUSCH duration (e.g., a parameter maxPUSCH-Duration) corresponding to the URLLC LCH. In this sense, consideration on further delay reduction may not be needed for a URLLC MAC PDU when the PUCCH duration for SR transmission overlaps with the PUSCH duration for MAC PDU transmission.

Case 2-4: Cancelling SR at the End of a PUSCH Duration when the UL Grant is Associated with a Low Priority In one implementation, all pending SR(s) triggered prior to the MAC PDU assembly may be cancelled and each respective sr-ProhibitTimer may be stopped when the MAC PDU is transmitted (e.g., at the start of a PUSCH duration) on a PUSCH scheduled by a UL grant associated with a high priority (e.g., a URLLC UL grant) and the MAC PDU includes a BSR MAC CE which contains buffer status information up to (and including) the last event that triggered a BSR prior to the MAC PDU assembly. On the other hand, all pending SR(s) triggered prior to the MAC PDU assembly may be cancelled and each respective sr-ProhibitTimer may be stopped when the MAC PDU is completely transmitted on a PUSCH scheduled by a UL grant associated with a low priority (e.g., a non-URLLC UL grant) and the MAC PDU includes a BSR MAC CE which contains buffer status information up to (and including) the last event that triggered a BSR prior to the MAC PDU assembly. Some implementations of a URLLC UL grant will be described in Cases 5-1 through Case 5-5.

One of the reasons to have different cancellation policies between transmission on URLLC UL grant and non-URLLC UL grant is that the base station may have already considered the service requirements of the URLLC LCH(s) on a UE when the base station provides a URLLC UL grant. To be more specific, a URLLC UL grant may meet the delay and reliability requirement of the URLLC LCH(s) on the UE. In this sense, consideration on further delay reduction may not be needed when the PUCCH duration for SR transmission overlaps with the PUSCH duration for MAC PDU transmission.

Case 2-5: Cancelling SR Depending on a Parameter maxPUSCH-Duration

In one implementation, an LCH may be configured with a maximum PUSCH duration (e.g., a parameter maxPUSCH-Duration). In one implementation, all pending SRs triggered by LCHs that are not configured with maxPUSCH-Duration or configured with maxPUSCH-Duration of value x (x being a positive real number) prior to the MAC PDU assembly may be cancelled and each respective sr-ProhibitTimer may be stopped when the MAC PDU is transmitted on a PUSCH with a PUSCH duration shorter than or equal to the value x and the MAC PDU includes a BSR MAC CE which contains buffer status information up to (and including) the last event that triggered a BSR prior to the MAC PDU assembly. On the other hand, all pending SRs triggered by LCHs that are configured with maxPUSCH-Duration of value x prior to the MAC PDU assembly may be cancelled and each respective sr-ProhibitTimer may be stopped when the MAC PDU is completely transmitted on a PUSCH with PUSCH duration longer than the value x and the MAC PDU includes a BSR MAC CE which contains buffer status information up to (and including) the last event that triggered a BSR prior to the MAC PDU assembly.

Case 2-6: Not Cancelling SR

In implementations provided in Case 2-6, one or more pending SRs may not be cancelled and each respective sr-ProhibitTimer may not be stopped by the transmission of a MAC PDU even if the MAC PDU includes a BSR MAC CE containing buffer status information up to (and including) the last event that triggered a BSR prior to the MAC PDU assembly. In one implementation, the UE (e.g., the MAC entity of the UE) may keep the SR(s) triggered prior to the MAC PDU assembly pending at the end of the PUSCH duration where the MAC PDU is transmitted. Referring to the example shown in FIG. 3, when the MAC PDU to be transmitted in PUSCH duration 312 includes a BSR MAC CE containing buffer status information up to (and including) the last event that triggered a BSR prior to MAC PDU assembly 311, the UE may not only keep the SR(s) triggered prior to MAC PDU assembly 311 pending at time t4, but also keep the SR(s) pending at time t6.

Case 2-6-1: Not Cancelling SR when the SR is Triggered by an LCH Associated with a High Priority In one implementation, all pending SRs triggered by logical channels associated with high priorities (e.g., URLLC LCHs) prior to the MAC PDU assembly may not be cancelled and each respective sr-ProhibitTimer may not be stopped when the MAC PDU is completely transmitted even if the MAC PDU includes a BSR MAC CE which contains buffer status information up to (and including) the last event that triggered a BSR prior to the MAC PDU assembly. On the other hand, all pending SRs triggered by logical channels associated with low priorities (e.g., non-URLLC LCHs) prior to the MAC PDU assembly may be cancelled and each respective sr-ProhibitTimer may be stopped even if the MAC PDU is transmitted and the MAC PDU includes a BSR MAC CE which contains buffer status information up to (and including) the last event that triggered a BSR prior to the MAC PDU assembly. Some implementations of a URLLC LCH will be described in Cases 4-1 through 4-7.

Case 2-6-2: Not Cancelling SR Triggered by an LCH Associated with a High Priority if the PUSCH Resource in which the MAC PDU is Transmitted Overlaps with the PUCCH Resource that Corresponds to the SR Configuration of the SR In one implementation, all pending SR(s) triggered by logical channels associated with high priorities (e.g., URLLC LCHs) prior to the MAC PDU assembly may not be cancelled and each respective sr-ProhibitTimer may not be stopped when the MAC PDU is completely transmitted and the MAC PDU includes a BSR MAC CE which contains buffer status information up to (and including) the last event that triggered a BSR prior to the MAC PDU assembly if the PUSCH resource in which the MAC PDU is transmitted overlaps with the PUCCH resource(s) that corresponds to the SR configuration(s) of the pending SR(s). Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly. Some implementations of a URLLC LCH will be described in Cases 4-1 through 4-7.

Case 2-6-3: Not Cancelling SR when the MAC PDU does not Include Data from an LCH Associated with a High Priority In one implementation, all pending SR(s) prior to the non-URLLC MAC PDU assembly may not be cancelled and each respective sr-ProhibitTimer may not be stopped when the non-URLLC MAC PDU is completely transmitted, even if the MAC PDU includes a BSR MAC CE which contains buffer status information up to (and including) the last event that triggered a BSR prior to the MAC PDU assembly. Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly. In one implementation, a non-URLLC MAC PDU may refer to a MAC PDU that does not include any data from a logical channel associated with a high priority (e.g., a URLLC LCH); a URLLC MAC PDU may refer to a MAC PDU that includes data from at least one logical channel associated with a high priority (e.g., a URLLC LCH). Some implementations of a URLLC LCH will be described in Cases 4-1 through 4-7.

Case 2-6-4: Not Cancelling Pending SR when the MAC PDU does not Include Data from an LCH Associated with a High Priority if the PUSCH Resource in which the MAC PDU is Transmitted Overlaps with the PUCCH Resource that Corresponds to the SR Configuration of the Pending SR In one implementation, the pending SR(s) prior to the non-URLLC MAC PDU assembly may not be cancelled and each respective sr-ProhibitTimer may not be stopped when the non-URLLC MAC PDU is completely transmitted and the MAC PDU includes a BSR MAC CE which contains buffer status information up to (and including) the last event that triggered a BSR prior to the MAC PDU assembly if the PUSCH resource in which the MAC PDU is transmitted overlaps with the PUCCH resource(s) that corresponds to the SR configuration(s) of the pending SR(s). Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly.

Case 2-6-5: Not Cancelling SR when the UL Grant is Associated with a Low Priority In one implementation, all pending SR(s) triggered prior to the MAC PDU assembly may not be cancelled and each respective sr-ProhibitTimer may not be stopped when the MAC PDU is completely transmitted on a PUSCH scheduled by a UL grant associated with a low priority (e.g., a non-URLLC UL grant) and the MAC PDU includes a BSR MAC CE which contains buffer status information up to (and including) the last event that triggered a BSR prior to the MAC PDU assembly. Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly. Some implementations of a URLLC UL grant will be described in Cases 5-1 through 5-5.

Case 2-6-6: Not Cancelling Pending SR when the UL Grant is Associated with a Low Priority if the PUSCH Resource in which the MAC PDU is Transmitted Overlaps with the PUCCH Resource that Corresponds to the SR Configuration of the Pending SR In one implementation, the pending SR(s) triggered prior to the MAC PDU assembly may not be cancelled and each respective sr-ProhibitTimer may not be stopped when the MAC PDU is completely transmitted on a PUSCH scheduled by a UL grant associated with a low priority (e.g., a non-URLLC UL grant) and the MAC PDU includes a BSR MAC CE which contains buffer status information up to (and including) the last event that triggered a BSR prior to the MAC PDU assembly if the PUSCH resource in which the MAC PDU is transmitted overlaps with the PUCCH resource(s) that corresponds to the SR configuration(s) of the pending SR(s). Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly. Some implementations of a URLLC UL grant will be described in Cases 5-1 through 5-5.

Case 2-6-7: Not Cancelling SR Depending on a Parameter maxPUSCH-Duration

In one implementation, an LCH may be configured with a maximum PUSCH duration (e.g., a parameter maxPUSCH-Duration). In one implementation, the pending SRs triggered by LCHs that are configured with maxPUSCH-Duration of value x (x being a positive real number) prior to the MAC PDU assembly may not be cancelled and each respective sr-ProhibitTimer may not be stopped when the MAC PDU is completely transmitted on a PUSCH with a PUSCH duration larger than the value x and the MAC PDU includes a BSR MAC CE which contains buffer status information up to (and including) the last event that triggered a BSR prior to the MAC PDU assembly if the PUSCH resource in which the MAC PDU is transmitted overlaps with the PUCCH resource(s) that corresponds to the SR configuration(s) of the SR(s). Else, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information up to (and including) the last event that triggered a BSR prior to the MAC PDU assembly.

Case 3: Partial Cancellation of Pending SRs

In one implementation, all pending SR(s) triggered prior to the MAC PDU assembly may be cancelled when the MAC PDU is transmitted and the MAC PDU includes a BSR MAC CE which contains buffer status information up to (and including) the last event that triggered a BSR prior to the MAC PDU assembly. If a BSR MAC CE contains the buffer status information of only part of the events that triggered a BSR prior to the MAC PDU assembly, none of the pending SRs triggered prior to the MAC PDU assembly may be cancelled, which may result in redundant pending SRs.

Figure 4:
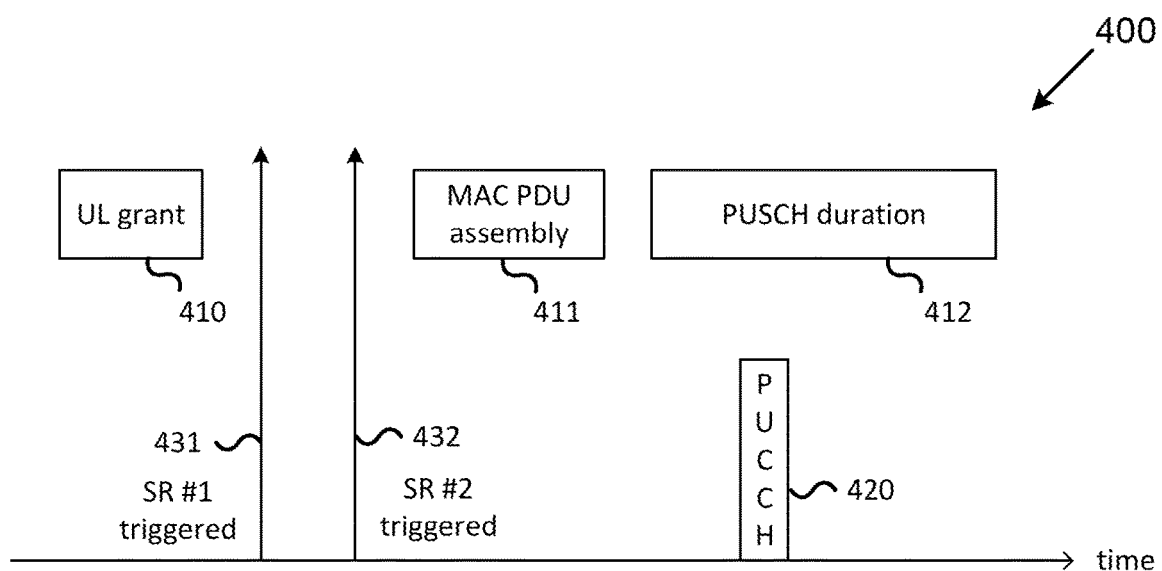
FIG. 4 includes a diagram illustrating an example partial SR cancellation, according to an example implementation of the present application.

FIG. 4 includes a diagram 400 illustrating an example partial SR cancellation, according to an example implementation of the present application. In this example, after the UE receives UL grant 410, two BSRs are triggered separately prior to MAC PDU assembly 411 by LCH #1 and LCH #2. These two LCHs belong to different LCGs (e.g., LCH #1 belongs to LCG #1, and LCH #1 belongs to LCG #2). If UL grant 410 does not satisfy the LCP mapping restriction(s) of both these LCHs, LCH #1 and LCH #2 may each trigger an SR. As shown in FIG. 4, in action 431, SR #1 is triggered by LCH #1 that belongs to LCG #1, and in action 432, SR #2 is triggered by LCH #2 that belongs to LCG #2.

A BSR MAC CE included in a MAC PDU generated by MAC PDU assembly 411 may be a truncated BSR MAC CE, which only contains the buffer status information of LCH #1. All pending SRs may not be cancelled by transmission of the MAC PDU because the BSR MAC CE included in the MAC PDU does not contain buffer status information up to (and including) the last event that triggered the BSR prior to MAC PDU assembly 411.

Another aspect to consider is the intra-UE UL prioritization between PUSCH duration 412 (where the MAC PDU is transmitted) and PUCCH duration 420 (where the pending SRs are transmitted). The intra-UE UL preemption (or prioritization) mechanism may take place when a PUSCH resource overlaps with a PUCCH resource for SR transmission. For example, based on an implicit or explicit prioritization rule, PUSCH duration 412 may be prioritized over PUCCH duration 420 in some cases, while PUCCH duration 420 may be prioritized over PUSCH duration 412 in some other cases. If the priority of PUCCH duration 420 for SR transmission corresponding to LCH #1 is lower than the priority of PUSCH duration 412, the SR triggered by LCH #1 may be neither cancelled nor allowed to be transmitted on PUCCH duration 420 that overlaps with PUSCH duration 412 where the MAC PDU is transmitted. Since the buffer status of LCH #1 is reported in PUSCH duration 412, the transmission of SR triggered by LCH #1 after the completion of PUSCH duration 412 becomes redundant in terms of resource efficiency. Some implementations are provided below to avoid SR transmission(s) after the PUSCH transmission if the BSR MAC CE transmitted on the PUSCH resource already includes the buffer status information of the LCH(s) that triggered the SR(s).

Case 3-1: Cancelling Part of the Pending SRs Triggered by Specific LCHs

In one implementation, the pending SR(s) triggered prior to the MAC PDU assembly may be cancelled and each respective sr-ProhibitTimer may be stopped when the MAC PDU is transmitted and the MAC PDU includes a BSR MAC CE which contains buffer status information of the LCHs that triggered the BSR(s) prior to the MAC PDU assembly. On the other hand, the pending SR(s) triggered prior to the MAC PDU assembly may not be cancelled and each respective sr-ProhibitTimer may not be stopped when the MAC PDU is transmitted and the MAC PDU includes a BSR MAC CE that does not contain buffer status information of the LCHs that triggered the BSR(s) prior to the MAC PDU assembly. As such, the transmission of a truncated BSR MAC CE may cancel part of the pending SRs triggered by LCH(s) that have been included in the buffer status in the truncated BSR MAC CE. Referring to FIG. 4, when a BSR MAC CE generated in MAC PDU assembly 411 already includes the buffer status information of LCG #1, SR(s) triggered by LCH(s) that belong to LCG #1 may be cancelled at the start of PUSCH duration 412 where the BSR MAC CE is transmitted. In addition, if the BSR MAC CE does not include the buffer status information of LCG #2. the UE may keep SR(s) triggered by LCH(s) that belong to LCG #2 pending at the start of PUSCH duration 412.

Case 3-2: Cancelling Part of the Pending SRs Triggered by Specific LCHs when the SR is Triggered by an LCH Associated with a Low Priority In one implementation, the pending SR(s) triggered by logical channels associated with a low priority (e.g., non-URLLC LCHs) prior to the MAC PDU assembly may be cancelled and each respective sr-ProhibitTimer may be stopped when the MAC PDU is transmitted and the MAC PDU includes a BSR MAC CE which contains buffer status information of the non-URLLC LCH(s) that triggered the BSR(s) prior to the MAC PDU assembly. On the other hand, the pending SR(s) triggered by logical channels associated with a high priority (e.g., URLLC LCHs) prior to the MAC PDU assembly may not be cancelled and each respective sr-ProhibitTimer may not be stopped when the MAC PDU is transmitted and the MAC PDU includes a BSR MAC CE which contains buffer status information of the URLLC LCH(s) that triggered the BSR(s) prior to the MAC PDU assembly. Some implementations of a URLLC LCH will be described in Cases 4-1 through 4-7.

Case 4: Implementations of URLLC LCH

Case 4-1: in one implementation, a bit indicator (e.g., a parameter URLLC-services) may be included in a logical channel configuration IE (e.g., LogicalChannelConfig) to indicate whether the corresponding LCH is a URLLC LCH. For example, the bit indicator being TRUE may indicate that the corresponding LCH is a URLLC LCH, and FALSE otherwise. The UE may receive the logical channel configuration via RRC signaling. In one implementation, the logical channel configuration IE may be as described in Table 1 below. Abstract Syntax Notation One (ASN.1) may be used to describe the data structure of various implementations of an IE in the present application.

TABLE 1

| LogicalChannelConfig ::= | SEQUENCE { |
|---|---|
| ul-SpecificParameters | SEQUENCE { |
| URLLC-services | BOOLEAN, |
| } | |
| OPTIONAL, -- Cond UL | |
| ... | |
| } | |

Case 4-2: in one implementation, a bit indicator (e.g., a parameter URLLC-services) may be included in an IE that modifies or adds a scheduling request (e.g., SchedulingRequestToAddMod) to indicate whether the corresponding SR configuration is specifically for URLLC services. For example, the bit indicator being TRUE may indicate that the corresponding SR configuration is for URLLC services, and FALSE otherwise. The UE may receive SchedulingRequestToAddMod via RRC signaling. Any LCH with the same scheduling request ID (e.g., SchedulingRequestId) as the SR configuration(s) with URLLC-services set to TRUE may be considered as a URLLC LCH. In one implementation, SchedulinzReauestToAddMod may be as described in Table 2 below.

TABLE 2

| SchedulingRequestToAddMod ::= | SEQUENCE { |
|---|---|
| schedulingRequestId | SchedulingRequestId, |
| URLLC-services | BOOLEAN, |
| } | |

Case 4-3: in one implementation, an LCH corresponding to a specific scheduling request ID (e.g., SchedulingRequestId) may be considered as a URLLC LCH. In one implementation, the specific SR ID may be either preconfigured or signaled by a base station. In one implementation, the specific SR ID may be included in a logical channel configuration IE (e.g., LogicalChannelConfig).

Case 4-4: in one implementation, a bit indicator (e.g., a parameter URLLC-services) may be included in a scheduling request resource configuration IE (e.g., SchedulingRequestResourceConfig) to indicate whether the corresponding SR resource configuration is specifically for URLLC services. For example, the bit indicator being TRUE may indicate that the corresponding SR resource configuration is for URLLC services, and FALSE otherwise. The UE may receive SchedulingRequestResourceConfig via RRC signaling. Any LCH with the same SchedulingRequestId as the SR resource configuration(s) with URLLC-services set to TRUE may be considered as an URLLC LCH. In one implementation, SchedulingRequestResourceConfig may be as described in Table 3 below.

TABLE 3

| SchedulingRequestResourceConfig :: | SEQUENCE { |
|---|---|
| URLLC-services | BOOLEAN, |
| schedulingRequestResourceId | SchedulingRequestResourceId, |
| schedulingRequestID | SchedulingRequestId, |
| resource | PUCCH-ResourceId |
| OPTIONAL -- Need M | |
| } | |

Case 4-5: in one implementation, an LCH corresponding to a specific scheduling request resource ID (e.g., SchedulingRequestResourceId) may be considered as a URLLC LCH. In one implementation, the specific SR resource ID may be either preconfigured or signaled by a base station. In one implementation, the specific SR resource ID may be included in a scheduling request resource configuration IE (e.g., SchedulingRequestResourceConfig).

Case 4-6: in one implementation, a URLLC LCH may be an LCH configured with a certain maxPUSCH-Duration and/or a certain Modulation and Coding Scheme (MCS)-requirement. MCS-requirement may be a type of LCP mapping restriction. In one implementation, UL MAC Service Data Units (SDUs) from the LCH configured with an MCS-requirement may only be mapped to a UL grant scrambled with a Modulation Coding Scheme Cell Radio Network Temporary Identifier (MCS-C-RNTI) or a UL grant which maps to a certain MCS table.

Case 4-7: in one implementation, a URLLC LCH may be an LCH which is configured with one or more LCP mapping restrictions. Examples of the LCP mapping restrictions may include allow edSCS-List, allowedServingCells, and allowedBWP-list. UL MAC SDUs from the LCH configured with allow edBWP-List may only be mapped to a UL grant with the indicated bandwidthPartId(s). More specifically, a URLLC LCH may be an LCH which is mapped to only a specific UL grant, e.g., a URLLC UL grant, via a specific LCP restriction configured for this LCH.

Case 5: Implementations of URLLC UL Grant

Case 5-1: in one implementation, a UL grant may include a bit indication in a DCI field indicating whether the UL grant is associated with a high priority (e.g., for the URLLC service) or a low priority (e.g., for the non-URLLC service). In one implementation, a bit indicator included in the DCI field of the UL grant may indicate whether the corresponding PUSCH scheduled by the UL grant is specifically for URLLC services or non-URLLC services. If the bit indicator indicates the corresponding PUSCH scheduled by the UL grant is specifically for URLLC services, the MAC PDU to be transmitted on the PUSCH may only include data from certain LCHs (e.g., URLLC LCHs). Implementations of a URLLC LCH may refer to Cases 4-1 through 4-7. Moreover, the bit indication included in the DCI field of the UL grant may also be used to resolve overlapping PUCCH resource(s) and/or PUSCH resource(s). An overlapping PUSCH/PUCCH resource may be referred to as a PUSCH/PUCCH resource that partially/fully overlaps with at least one other PUSCH/PUCCH resource in the time domain. In one implementation, when overlapping occurs, the UE may use the bit indication to select one out of the overlapping PUSCH/PUCCH resources for transmission. In one implementation, the UE may transmit on the overlapping PUSCH/PUCCH resource that corresponds to the largest bit indication value (e.g., 1). In one implementation, the UE may transmit on the overlapping PUSCH/PUCCH resource that corresponds to the smallest bit indication value (e.g., 0)

Case 5-2: in one implementation, a UL grant received on the PDCCH for the MAC entity's C-RNTI may imply that the UL grant is specifically for the non-URLLC services. On the other hand, a UL grant received on the PDCCH for the MAC entity's MC S-C-RNTI or a specific RNTI that is different from the C-RNTI may imply that the UL grant is specifically for the URLLC services.

Case 5-3: in one implementation, whether the UL grant is specifically for the URLLC services or the non-URLLC services may be implicitly indicated through RRC signaling. In one implementation, a low Block Error Rate (BLER) MCS table configured within ConfiguredGrantConfig IE within BWP-UplinkDedicated IE may imply that the corresponding configured grant PUSCH resources are URLLC UL grants. Otherwise, the corresponding configured grant PUSCH resources are non-URLLC UL grants. In one implementation, a low BLER MCS table configured within PUSCH-Config IE within BWP-UplinkDedicated IE may imply that the corresponding configured grant PUSCH resources are URLLC UL grants. Otherwise, the corresponding configured grant PUSCH resources are non-URLLC UL grants.

Case 5-4: in one implementation, a URLLC UL grant may be indicated by fallback DCI (e.g., DCI format 0_0), whereas a non-URLLC UL grant may be indicated by non-fallback DCI (e.g., DCI format 0_1). Alternatively, a URLLC UL grant may be indicated by a new DCI format that is different from the non-fallback DCI (e.g., DCI format 0_1) or the fallback DCI (e.g., DCI format 0_0).

Case 5-5: in one implementation, a URLLC UL grant may be a UL grant that preempts/cancels/prioritizes another ongoing PUSCH transmission as a result of intra-UE or inter-UE UL prioritization.

Figure 5:
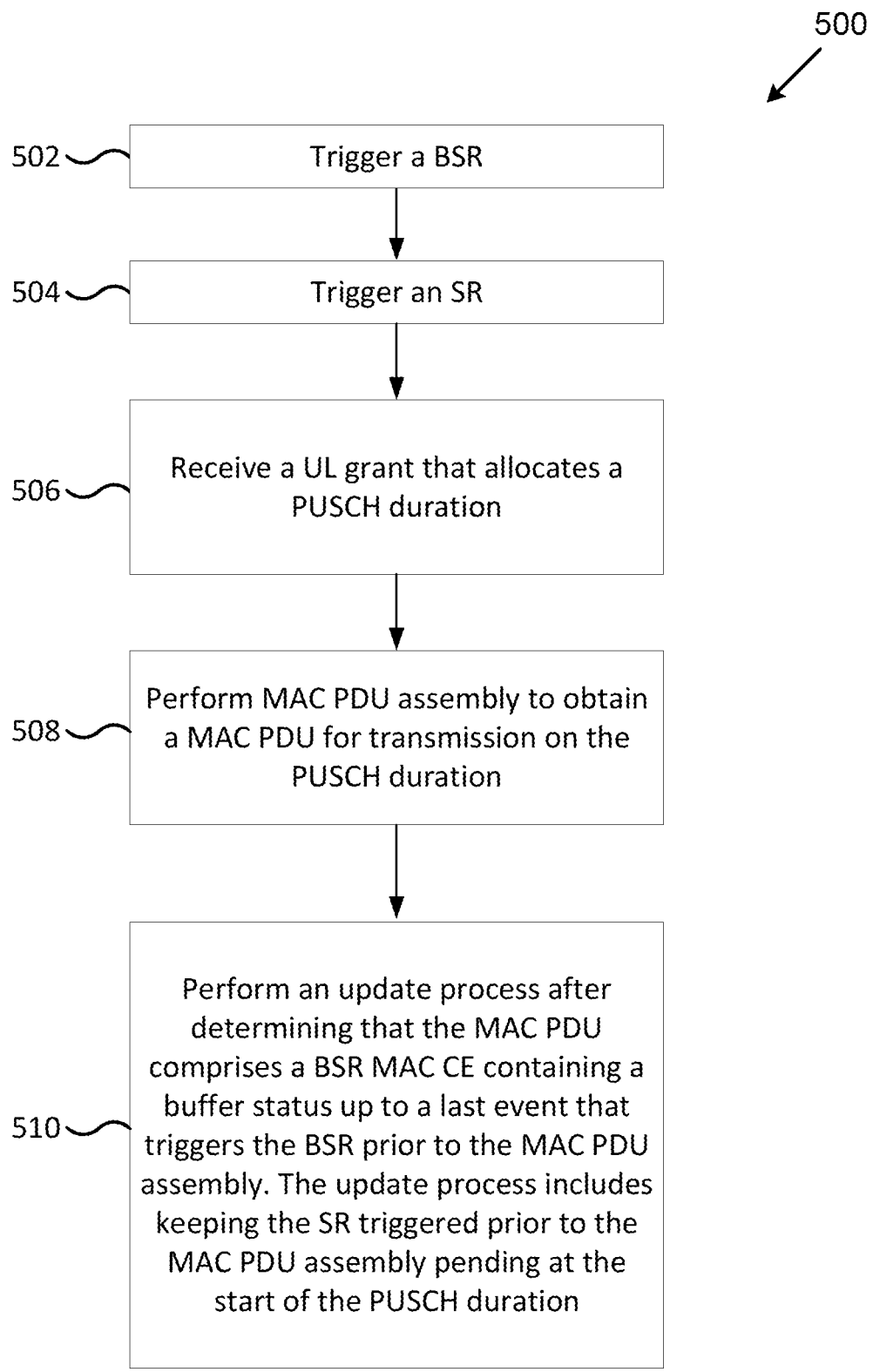
FIG. 5 is a flowchart of an example method for handling a triggered SR and a triggered BSR performed by a UE, according to an example implementation of the present application.

FIG. 5 is a flowchart of an example method 500 for handling a triggered SR and a triggered BSR performed by a UE, according to an example implementation of the present application. In action 502, the UE triggers a BSR. In action 504, the UE triggers an SR. In action 506, the UE receives a UL grant that allocates a PUSCH duration. In action 508, the UE performs MAC PDU assembly to obtain a MAC PDU for transmission on the PUSCH duration. In action 510, the UE performs an update process after determining that the MAC PDU comprises a BSR MAC CE containing buffer status information up to a last event that triggers the BSR prior to the MAC PDU assembly. There may be several implementations for the update process. In one implementation, the update process includes keeping the SR triggered prior to the MAC PDU assembly pending at the start of the PUSCH duration.

Figure 6:
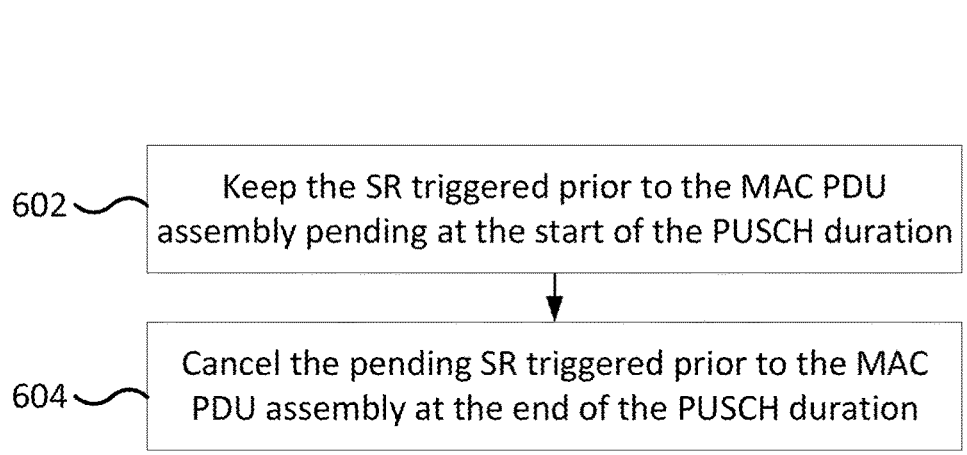
FIG. 6 is a flowchart of an example method for an update process performed by a UE, according to an example implementation of the present application.

FIG. 6 is a flowchart of an example method 600 for an update process (e.g., the update process in action 510 of FIG. 5) performed by a UE, according to an example implementation of the present application. The update process in this implementation may include actions 602 and 604. In action 602, the UE may keep the SR triggered prior to the MAC PDU assembly pending at the start of the PUSCH duration. In action 604, the UE may cancel the pending SR triggered prior to the MAC PDU assembly at the end of the PUSCH duration. Related description of this implementation may be found in Cases 2-1 through 2-5.

Figure 7:
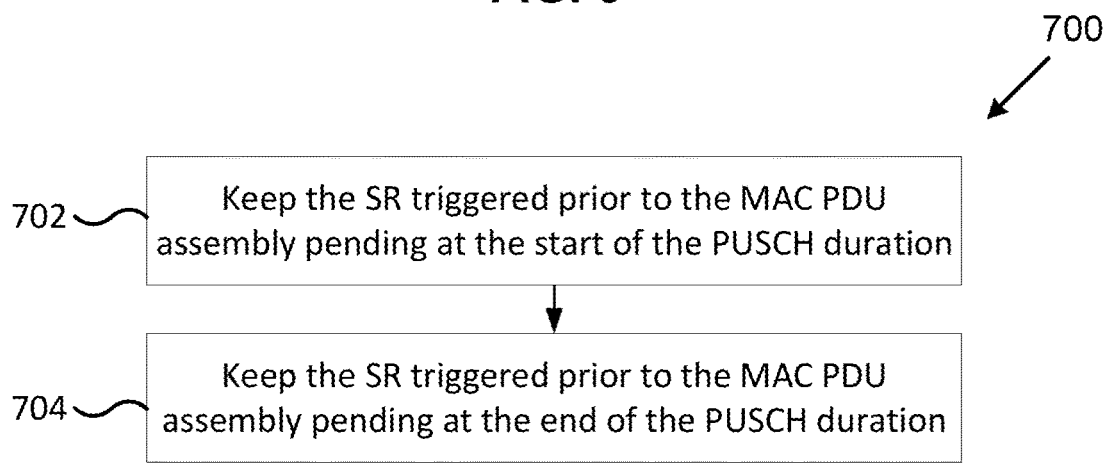
FIG. 7 is a flowchart of another example method for an update process performed by a UE, according to an example implementation of the present application.

FIG. 7 is a flowchart of an example method 700 for an update process (e.g., the update process in action 510 of FIG. 5) performed by a UE, according to an example implementation of the present application. The update process in this implementation may include actions 702 and 704. In action 702, the UE may keep the SR triggered prior to the MAC PDU assembly pending at the start of the PUSCH duration. In action 704, the UE may keep the SR triggered prior to the MAC PDU assembly pending at the end of the PUSCH duration. Related description of this implementation may be found in Case 2-6.

Figure 8:
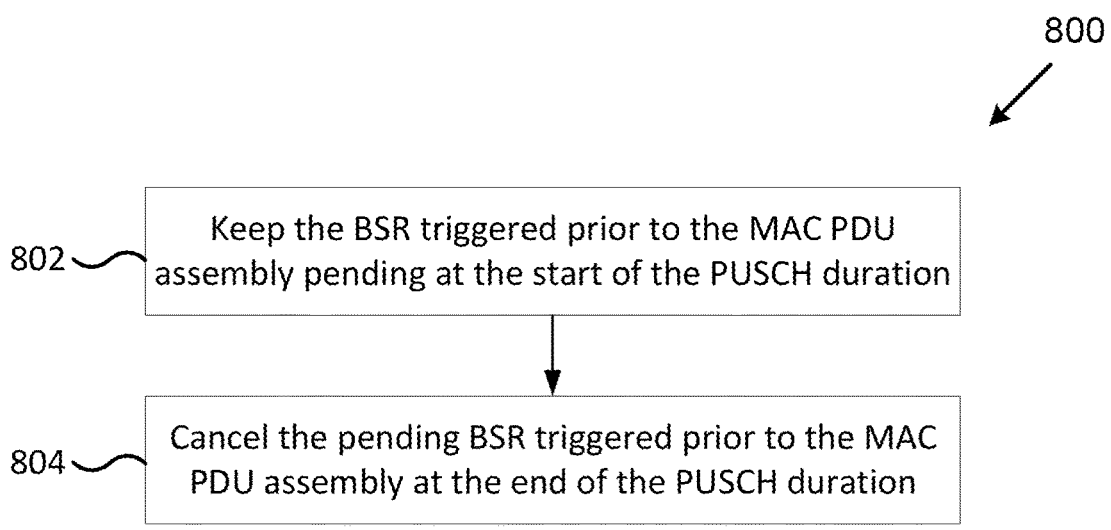
FIG. 8 is a flowchart of yet another example method for an update process performed by a UE, according to an example implementation of the present application.

FIG. 8 is a flowchart of an example method 800 for an update process (e.g., the update process in action 510 of FIG. 5) performed by a UE, according to an example implementation of the present application. The update process in this implementation may include actions 802 and 804. In action 802, the UE may keep the BSR triggered prior to the MAC PDU assembly pending at the start of the PUSCH duration. In action 804, the UE may cancel the pending BSR triggered prior to the MAC PDU assembly at the end of the PUSCH duration. Related description of this implementation may be found in Cases 1-1 through 1-4.

It should be noted that the actions shown in FIG. 6, FIG. 7, and FIG. 8 may also be selectively combined to achieve other update processes. For example, in one implementation, the update process (which is mentioned in action 510 of FIG. 5) may include actions 602, 604, 802, and 804. In another implementation, the update process may include actions 702, 704, 802, and 804.

Figure 9:
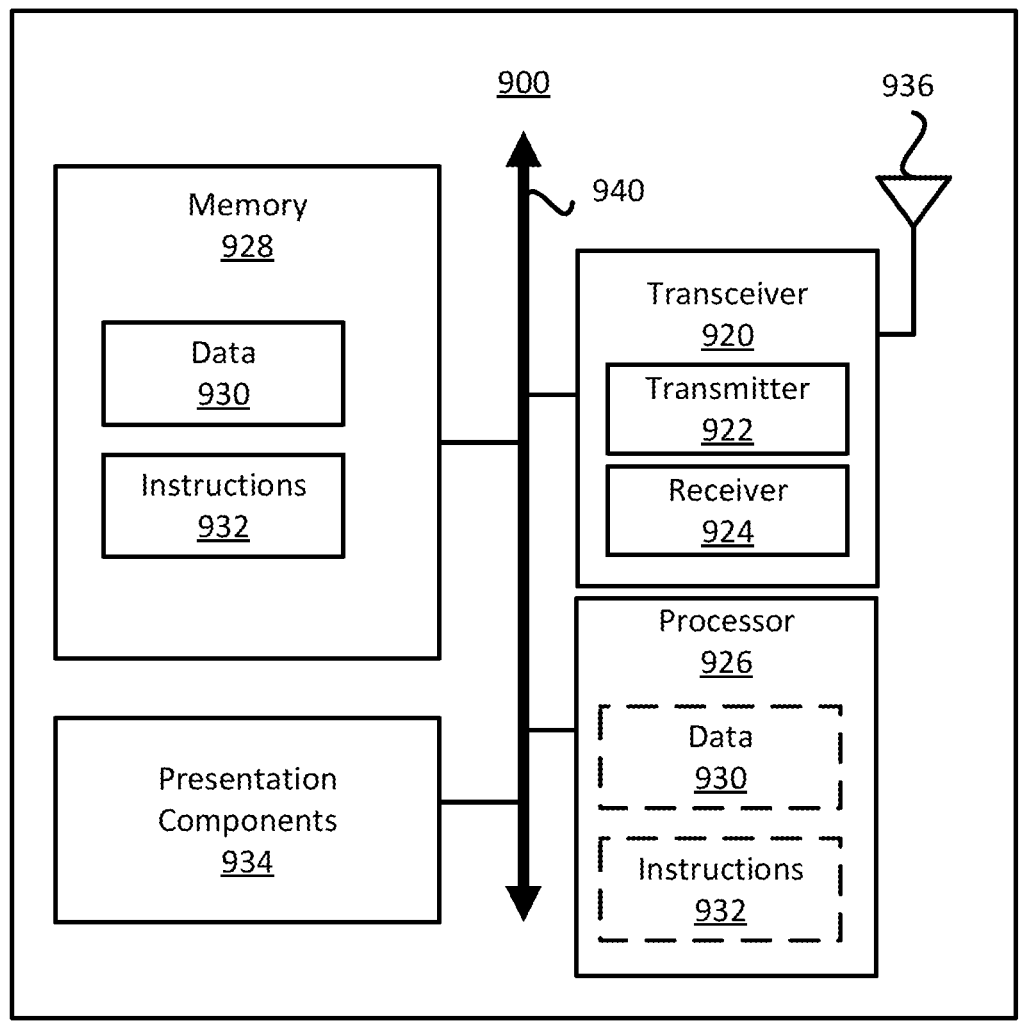
FIG. 9 is a block diagram illustrating a node for wireless communication, in accordance with various aspects of the present application.

FIG. 9 is a block diagram illustrating a node for wireless communication, in accordance with various aspects of the present application. As shown in FIG. 9, a node 900 may include a transceiver 920, a processor 928, a memory 934, one or more presentation components 938, and at least one antenna 936. The node 900 may also include an RF spectrum band module, a base station (BS) communications module, a network communications module, and a system communications management module, Input/Output (I/O) ports, I/O components, and power supply (not explicitly shown in FIG. 9). Each of these components may be in communication with each other, directly or indirectly, over one or more buses 940. In one implementation, the node 900 may be a UE or a base station that performs various functions described herein, for example, with reference to FIGS. 1 through 8.

The transceiver 920 having a transmitter 922 (e.g., transmitting/transmission circuitry) and a receiver 924 (e.g., receiving/reception circuitry) may be configured to transmit and/or receive time and/or frequency resource partitioning information. In some implementations, the transceiver 920 may be configured to transmit in different types of subframes and slots including, but not limited to, usable, non-usable and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data. Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 934 may include computer-storage media in the form of volatile and/or non-volatile memory. The memory 934 may be removable, non-removable, or a combination thereof. Example memory includes solid-state memory, hard drives, optical-disc drives, and etc. As illustrated in FIG. 9, The memory 934 may store computer-readable, computer-executable instructions 932 (e.g., software codes) that are configured to, when executed, cause the processor 928 to perform various functions described herein, for example, with reference to FIGS. 1 through 8. Alternatively, the instructions 932 may not be directly executable by the processor 928 but be configured to cause the node 900 (e.g., when compiled and executed) to perform various functions described herein.

The processor 928 (e.g., having processing circuitry) may include an intelligent hardware device, e.g., a Central Processing Unit (CPU), a microcontroller, an ASIC, and etc. The processor 928 may include memory. The processor 928 may process the data 930 and the instructions 932 received from the memory 934, and information through the transceiver 920, the base band communications module, and/or the network communications module. The processor 928 may also process information to be sent to the transceiver 920 for transmission through the antenna 936, to the network communications module for transmission to a core network.

One or more presentation components 938 presents data indications to a person or other device. Examples of presentation components 938 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
   one or more non-transitory computer-readable media having computer-executable instructions embodied thereon; and
   at least one processor coupled to the one or more non-transitory computer-readable media, wherein the at least one processor is configured to execute the computer-executable instructions to:
   detect arrival of data at a logical channel;
   trigger a Buffer Status Report (BSR) from the logical channel;
   trigger a Scheduling Request (SR) from the logical channel;
   receive an uplink (UL) grant that allocates a Physical Uplink Shared Channel (PUSCH) duration;
   perform a Medium Access Control (MAC) Protocol Data Unit (PDU) assembly to obtain a MAC PDU for transmission on the PUSCH duration, wherein the MAC PDU includes the data from the logical channel; and
   perform an update process after determining that the MAC PDU comprises a BSR MAC Control Element (CE) containing buffer status information up to a last event that triggers the BSR prior to the MAC PDU assembly;
   wherein the update process comprises:
   keeping the SR triggered prior to the MAC PDU assembly pending at the start of the MAC PDU transmission on the PUSCH duration, wherein the PUSCH duration overlaps with a Physical Uplink Control Channel (PUCCH) duration, and wherein the start of the MAC PDU transmission on the PUSCH duration occurs prior to the start of the PUCCH duration.

2. The UE of claim 1, wherein the update process further comprises:
   canceling the pending SR triggered prior to the MAC PDU assembly when the MAC PDU transmission on the PUSCH duration is completed.

3. The UE of claim 1, wherein the update process further comprises:
   keeping the SR triggered prior to the MAC PDU assembly pending when the MAC PDU transmission on the PUSCH duration is completed.

4. The UE of claim 1, wherein the update process further comprises:
   keeping the BSR triggered prior to the MAC PDU assembly pending at the start of the MAC PDU transmission on the PUSCH duration; and
   canceling the pending BSR triggered prior to the MAC PDU assembly when the MAC PDU transmission on the PUSCH duration is completed.

5. The UE of claim 1, wherein:
   the logical channel is associated with a high priority; and
   the MAC PDU does not include data from the logical channel.

6. The UE of claim 5, wherein the at least one processor is further configured to execute the computer-executable instructions to:
   receive, via a Radio Resource Control (RRC) signaling, a configuration that includes a bit indication, wherein:
   the bit indication is set to a first value to indicate that the logical channel is associated with the high priority; and
   the bit indication is set to a second value to indicate that the logical channel is not associated with the high priority.

7. The UE of claim 6, wherein the configuration is configured in a scheduling request resource configuration or a logical channel configuration.

8. The UE of claim 1, wherein the MAC PDU does not include data from a logical channel associated with a high priority.

9. The UE of claim 1, wherein the UL grant is not associated with a high priority.

10. The UE of claim 9, wherein the UL grant comprises a bit indication in a Downlink Control Information (DCI) field, wherein:
   the bit indication is set to a first value to indicate that the UL grant is associated with the high priority; and
   the bit indication is set to a second value to indicate that the UL grant is not associated with the high priority.

11. A method for wireless communication performed by a user equipment (UE), the method comprising:
   detecting arrival of data at a logical channel;
   triggering a Buffer Status Report (BSR) from the logical channel;
   triggering a Scheduling Request (SR) from the logical channel;
   receiving an uplink (UL) grant that allocates a Physical Uplink Shared Channel (PUSCH) duration;
   performing a Medium Access Control (MAC) Protocol Data Unit (PDU) assembly to obtain a MAC PDU for transmission on the PUSCH duration, wherein the MAC PDU includes the data from the logical channel; and
   performing an update process after determining that the MAC PDU comprises a BSR MAC Control Element (CE) containing buffer status information up to a last event that triggers the BSR prior to the MAC PDU assembly;
   wherein the update process comprises:
      keeping the SR triggered prior to the MAC PDU assembly pending at the start of the MAC PDU transmission on the PUSCH duration, wherein the PUSCH duration overlaps with a Physical Uplink Control Channel (PUCCH) duration, and wherein the start of the MAC PDU transmission on the PUSCH duration occurs prior to the start of the PUCCH duration.

12. The method of claim 11, wherein the update process further comprises:
   canceling the pending SR triggered prior to the MAC PDU assembly when the MAC PDU transmission on the PUSCH duration is completed.

13. The method of claim 11, wherein the update process further comprises:
   keeping the SR triggered prior to the MAC PDU assembly pending when the MAC PDU transmission on the PUSCH duration is completed.

14. The method of claim 11, wherein the update process further comprises:
   keeping the BSR triggered prior to the MAC PDU assembly pending at the start of the MAC PDU transmission on the PUSCH duration; and
   canceling the pending BSR triggered prior to the MAC PDU assembly when the MAC PDU transmission on the PUSCH duration is completed.

15. The method of claim 11, wherein:
the logical channel is associated with a high priority; and
the MAC PDU does not include data from the logical channel.

16. The method of claim 15, further comprising:
   receiving, via a Radio Resource Control (RRC) signaling, a configuration that includes a bit indication, wherein:
      the bit indication is set to a first value to indicate that the logical channel is associated with the high priority; and
      the bit indication is set to a second value to indicate that the logical channel is not associated with the high priority.

17. The method of claim 16, wherein the configuration is configured in a scheduling request resource configuration or a logical channel configuration.

18. The method of claim 11, wherein the MAC PDU does not include data from a logical channel associated with a high priority.

19. The method of claim 11, wherein the UL grant is not associated with a high priority.

20. The method of claim 19, wherein the UL grant comprises a bit indication in a Downlink Control Information (DCI) field, wherein:
   the bit indication is set to a first value to indicate that the UL grant is associated with the high priority; and
   the bit indication is set to a second value to indicate that the UL grant is not associated with the high priority.

* * * * *